United States Patent [19]

Heinz

[11] 4,060,314
[45] Nov. 29, 1977

[54] TWO AXES REMOTE MIRROR MOUNT

[75] Inventor: Theodore A. Heinz, Moorpark, Calif.

[73] Assignee: Rockwell International Corporation, El Segundo, Calif.

[21] Appl. No.: 700,430

[22] Filed: June 28, 1976

[51] Int. Cl.² ............................................. G02B 5/08
[52] U.S. Cl. .................................. 350/285; 248/487; 350/289
[58] Field of Search ....................... 350/6, 7, 285, 288, 350/289, 310; 331/94.5 C, 94.5 D; 248/474, 476, 478, 479, 485–487, 372, 374–375, 380, 381, 495

[56] References Cited

U.S. PATENT DOCUMENTS 3,753,150  8/1973  Zar ................................. 350/289 UX

OTHER PUBLICATIONS

NASA Tech. Brief, Brief 66-10199, May 1966.

Primary Examiner—F. L. Evans
Attorney, Agent, or Firm—L. Lee Humphries; Robert G. Upton

[57] ABSTRACT

Three equidistantly spaced actuators are utilized to provide both tip and tilt positioning of a mirror mount backup plate to which a mirror is mounted. Two of the three actuators are preloaded differential ball-bearing screws driven by geared stepping motors. The third actuator is fixed thus providing a two axes mirror adjustment capability. The backup plate is suspended from the mirror mount base by specially designed flexures.

8 Claims, 8 Drawing Figures

TWO AXES REMOTE MIRROR MOUNT

CROSS-REFERENCE TO RELATED APPLICATION

This invention is related to a copending mirror mount application, Ser. No. 593,357, filed July 7, 1975 assigned to the same assignee as this invention. The application having a different actuating means than is described and claimed in the present invention.

BACKGROUND OF THE INVENTION

1. Field of the Invention

This invention relates to a means to mount and adjust reflecting surfaces such as mirrors and the like.

More particularly, this invention describes and claims a means to position laser mirrors in tip and tilt about two orthoganol axes with a very high degree of precision heretofore unobtainable with prior art positioning devices.

2. Description of the Prior Art

Conventional mirror mounts such as those associated with optical labs and telescopes are generally not suitable to precisely position mirrors utilized in the large laser field of technology.

Typically, conventional mirror mounts are suspended from a base support structure by a system of screw jacks and springs.

These devices are unsuitable in a severe vibration environment commonly associated with, for example, a large laser lab where a system of highpower laser resonator mirror mounts must support mirrors weighing from 25 to 40 pounds or more each.

Laser mirrors are normally affixed to a plate that is suspended from and movable with respect to a backup support plate firmly mounted to an optical "bench". Since laser beams are generally directed substantially horizontally, the mirror surfaces are generally perpendicular to gravitational forces. Thus, the mirrors are cantilevered from the surface of the support backup plate and must rigidly support a relatively heavy weight suspended therefrom.

A series of springs associated with conventional mounts placed between the rigid support plate and the movable plate from which the mirror is mounted provides a force that maintains one or more mirror actuators in compression or tension, thereby stabilizing the mirror. However, conventional type spiral springs have little or no resistance to shear forces which are large in heavy laser mirrors cantilevered from a rigid mount. Therefore, pins or ball-type sockets in combination with the aforementioned spring are generally required to support the movable plate in shear. The supporting devices introduce frictional hysteresis that inherently reduces the required positional accuracy and precision of laser mirrors.

Additionally, where screw-type actuation is manually or mechanically manipulated to position mirrors, some type of locking mechanism is required. During activation of the locking mechanism positioning errors will very likely be introduced. For example, the simple procedure of tightening a set screw to "lock" a mirror usually requires much tedious and time-consuming trial and error to align one or more mirrors to a desired setting.

The present invention effectively eliminates frictional hysteresis associated with conventional ball or pin supports as well as eliminating the need for mechanical type of locking mechanisms.

In addition, the present invention eliminates the frictional hysteresis error normally introduced in a conventional differential screw actuator and greatly reduces errors introduced by contamination of one sort or another or by uneven ground and polished surfaces by providing a preloaded differential ball-bearing screw as a precision positioning means.

SUMMARY OF THE INVENTION

An apparatus to suspend and remotely position a mirror affixed to a backup plate and cantilevered from a fixed support by a series of V-shaped beam flexure suspension supports is disclosed. The mirror is manipulated by at least one preloaded differential ball-bearing screw actuating means affixed between the backup plate at a first end and the fixed support at a second end. The ball-bearing screw has a multiplicity of ball bearings encapsulated within an enclosed continuous helical track at both the first and second ends, the helical track at the first end having a different pitch angle than the helical track at the second end to provide differential movement between the first and second ends as the screw is rotated either clockwise or counter-clockwise. Each of the multiplicity of ball bearings within the enclosed continuous track are in compressional contact with the walls formed by the enclosed continuous track, the compressional force being supplied by the series of V-shaped beam flexures between the backup plate and the fixed support, the combined deflection of both ball and contact surface of the walls averages out any error introduced between the multiplicity of balls which provides an adjustment precision of the backup plate with respect to the fixed support of about $0.5 \times 10^{-6}$ in.

The backup plate is supported by V-shaped flexures arranged in pairs to uniformly load the backup plate thereby reducing distortion caused by uneven spring loads in the backup plate. Each flexure in a pair of the flexures is aligned in parallel with the V-portion of one of the flexures positioned opposite to the "V" of the other flexure. Each pair of flexures being positioned about 120° one from the other, the legs of the flexures being aligned to intersect the center of the circular backup plate and support structure. Each leg of the individual flexures is tapered in thickness from a thick base at one end to a thin intermediate section back to a thick base at the other end of the legs, the legs are tapered to provide a more constant stress condition to minimize the ball screw actuator preload variation over the adjustment range of the actuator. These flexure assemblies allow the mirror to tip and tilt with a minimum of frictional hysteresis.

A unique flexible locking ring adjacent each of the ends of the actuators is utilized to prevent the actuator mechanism from rotating during operation. The ring has a center opening formed by the ring to accept the ends of the ball screw. The ring additionally has a series of arcuate slots formed by the ring between the opening and an outer peripheral edge of the ring. The edge or periphery of the ring is fixed to the backup plate. The inner portion of the ring is locked to the ends of the ball screw. The arcuate slots allow the ends of the screw to move axially inwardly and outwardly and through a displacement substantially transverse to the face of the locking rings while the rings simultaneously prevent rotation of the actuator ball nut.

Positioning of a backup plate to which the mirror is mounted is achieved by driving two differential screw actuators with stepping motors. The electronic controls for the stepping motors compensate for "backlash", making it possible to accurately position the mirror. The differential ball screw in combination with gear reduction provides less than one micro inch of mirror movement per step of actuator motion. The actuators are locked in place by the static torque of the motors with or without the fields energized, thus eliminating mirror misalignment which often occurs during locking of conventional mounts when set screws or the like are manually tightened. This feature provides a major advantage over conventional laser mirror mounts.

Thus, it is an object of this invention to provide a mirror mount with an unusual degree of precision that will support heavy movable laser mirrors with a minimum of hysteresis.

More specifically, it is an object of this invention to provide a precision mirror mount that is actuatable through two stepping motors mechanically connected to the mirror mount by at least a pair of preloaded differential ball screw actuators to provide tip and tilt movement of the laser mirrors. The mirror is supported by mirror mount flexure assemblies maintained in compression by the ball screw jack actuators which are designed to resist shear forces and to minimize frictional hysteresis. Conventional differential screw actuators are fairly common to precision optical mounts and micropositioners. The adaptation of the ball-bearing screw to this device is a unique feature of this design. In addition to reducing frictional hysteresis, the ball-bearing screw is preloaded to greatly reduce the effects on precision of both surface finish and contamination.

A conventional screw is highly sensitive to surface quality. The precision of adjustment required for the actuator in high-power laser resonator mirror mounts is an order of magnitude better (10×) than the RMS value of a finely ground surface finish even without considering the effects of oil films, particulate contaminants (dirt), etc. In the proposed design, a ball-bearing screw is operated at maximum design preloads creating large ball and contact surface strains. The combined deflection of both ball and contact surface is many times (100× to 1000×) greater than the adjustment precision required (on the order of 1 to 10 x $10^{-6}$ in.). Since this deflection is also many times larger than imperfections of machined surfaces and when combined with the error averaging effect of the multiplicity of such ball contacts, a significant improvement in precision is obtained. An advantage over the prior art is the elimination of mechanical set screws and the like to set the position of the movable mirror by utilizing the static torque of the stepping motors with or without the "fields" energized.

The above-noted objects and advantages of the present invention will be more fully understood upon a study of the following detailed description in conjunction with the detailed drawings.

DESCRIPTION OF THE PREFERRED EMBODIMENTS

Figure 1:
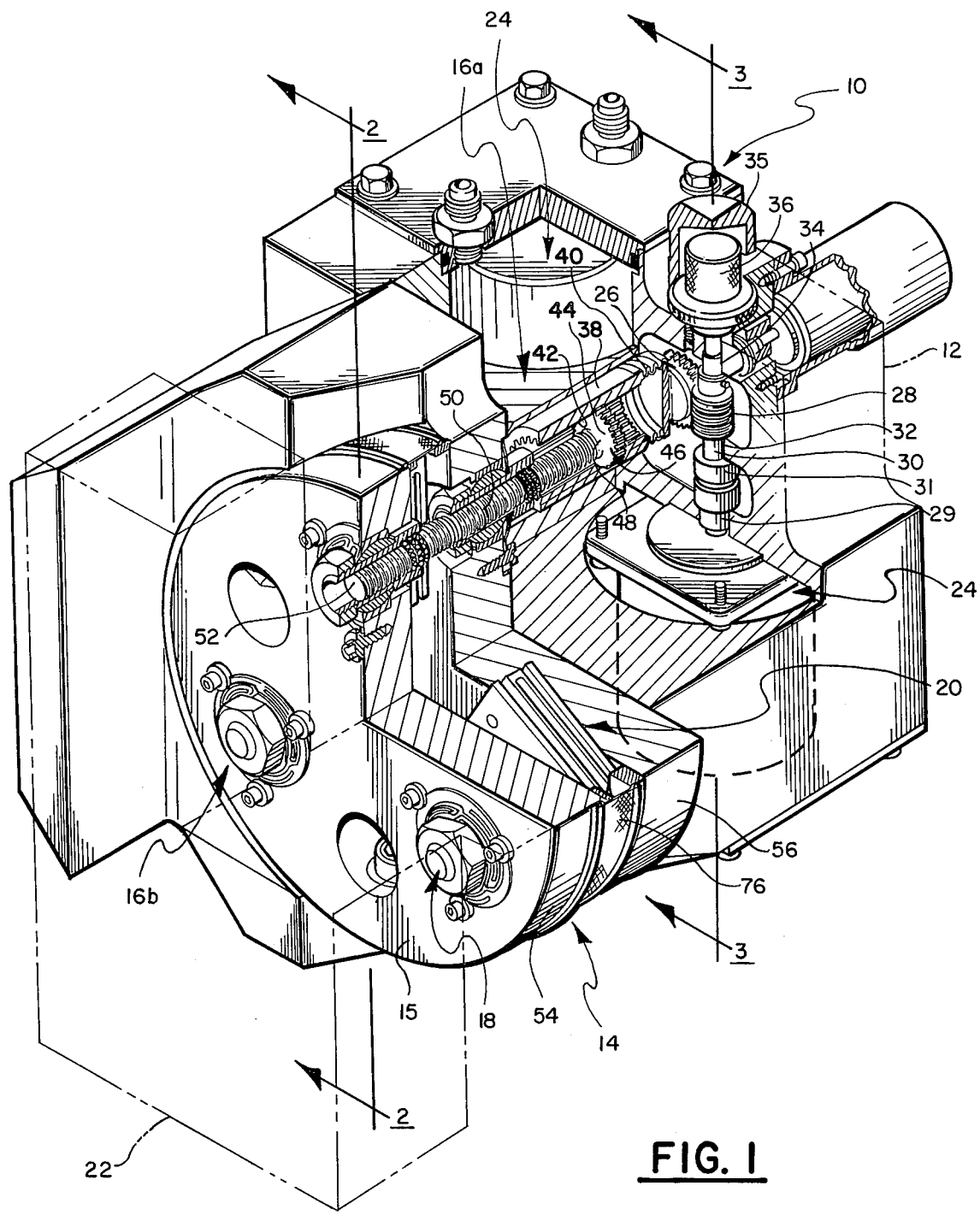
FIG. 1 is a perspective view partially cut away of the preferred embodiment of the present invention.

Referring now to FIG. 1, the 2-axes remote mirror mount apparatus generally designated as 10 consists of a housing 12, a laser mirror mount backup plate assembly generally designated as 14, a pair of differential ball screw actuating devices generally designated as 16a and 16b, a fixed post support actuator 18 and a series of flexure assemblies generally designated as 20. A laser mirror 22 shown in phantom line, for example, is connected to an adapter plate 75 (FIG. 2) then to face 15 of movable backup plate 54. The differential ball screws 16a and 16b are driven by a pair of independent stepping motors generally designated as 24. The stepping motors 24 are coupled to gear 26 of ball screw assembly 16 through a worm gear 28 connected to a shaft 30 which in turn is connected to the shaft 29 of the stepping motor 24 through coupling 31. Shaft 30 is supported within the fixed housing 12 at bearings 32 and 34. A manually manipulatable knob 36 is affixed to the end of shaft 30. The knurled knob 36 is utilized to manually position the differential ball screw 16.

Gear 26 is coupled to a cylinder 38 through a flexible coupling 40 positioned between gear 26 and cylinder 38. The inner walls 42 of cylinder 38 is comprised of a multiplicity of axially extending gear-type grooves designed to mate with gear 44 affixed to end 46 of ball screw shaft 48. The opposite end 52 of shaft 50 terminates near face 15 of movable backup plate 54. Cylinder 38 allows gear 46 connected to shaft 50 to translate axially within the grooves 44 of cylinder 38, during operation of the laser mirror mount apparatus.

Figure 2:
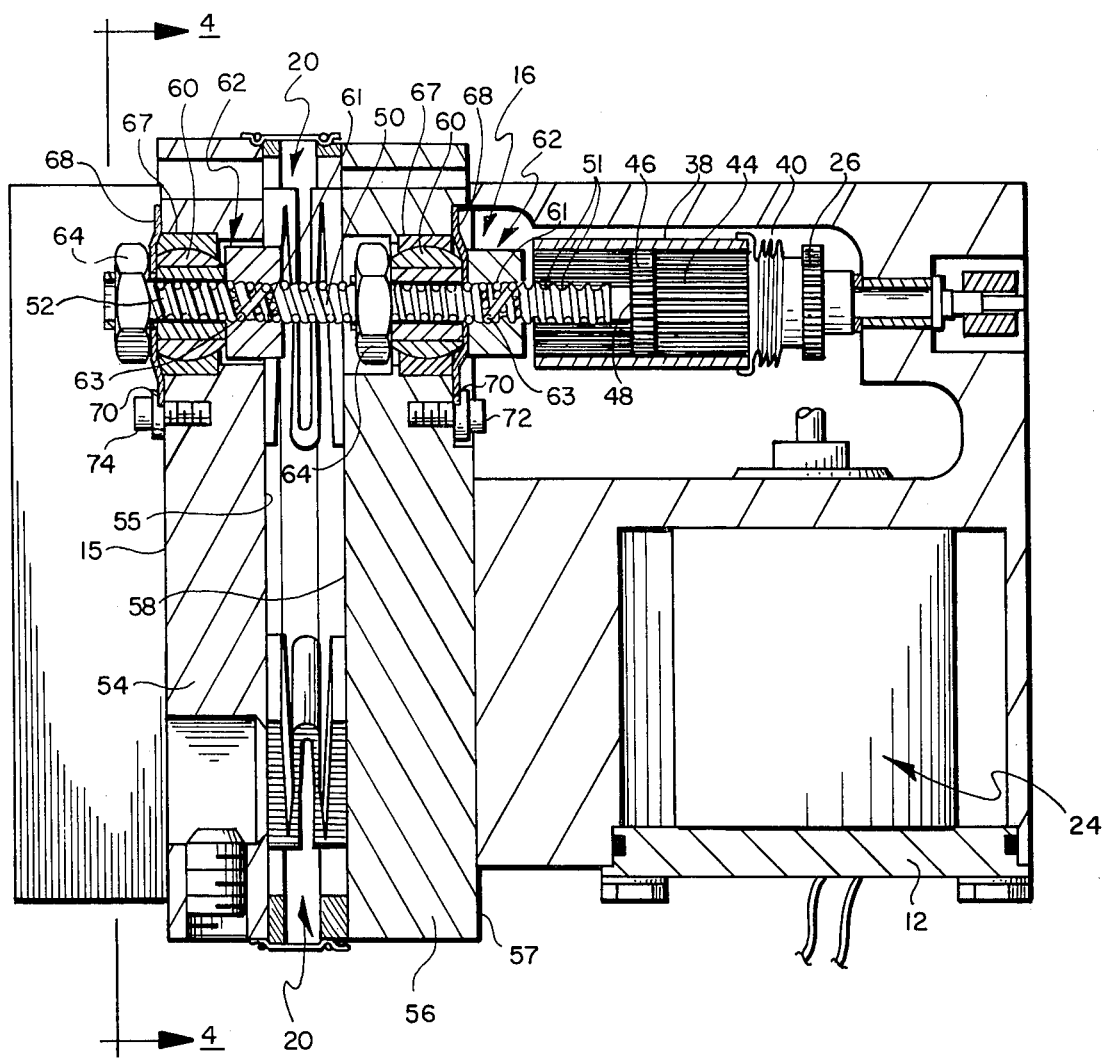
FIG. 2 is a cross-sectional view of the present invention taken along lines 2—2 of FIG. 1.
Figure 5:
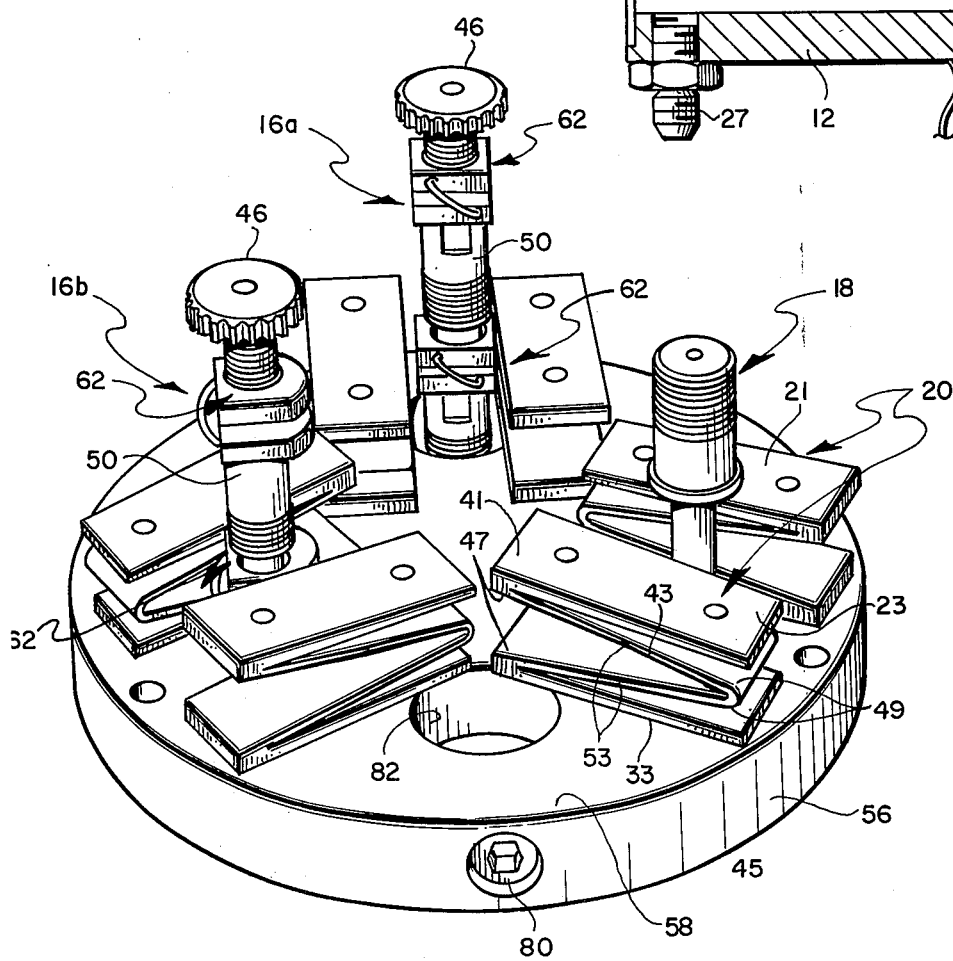
FIG. 5 is a perspective view of the laser mirror mount back plate with the mirror segment removed illustrating the relationship of the flexure beams adjacent each of the ball screw actuators and the fixed actuator.

The laser mirror backup plate assembly generally designated as 14 consists of a pair of plates 54 and 56. Movable plate 54 supports the laser mirror 22 while plate 56 is rigidly affixed to housing 12 at face 57 (FIG. 2). Interface 55 of movable plate 54 and inner face 58 of plate 56 are separated by a series of V-shaped flexure assemblies generally designated as 20, the flexure assemblies 20 are positioned in parallel pairs, one each on opposite sides of each of the actuators 16a and 16b as illustrated in FIG. 5.

Referring specifically to FIG. 2, shaft 50 extends through both plates 54 and 56. Shaft 50 is supported within a pair of swivel joints 60, one each in plates 54 and 56. The swivel joints 60 are locked to shaft 50 by ball nut generally designated as 62 and by locking nuts 64. The shaft 50 is prevented from turning by a perforated washer generally designated as 68 to be described with reference to FIG. 8 later on in this specification. The outer peripheral edge 70 of washer 68 is locked to plate 56 by lock screw 72 and the peripheral edge 70 of washer 68 is locked to plate 54 by lock screw 74. The lock washer 68 allows the movable backup plate 54 to tip and tilt while preventing ball nut 62 from rotating within the plates 54 and 56.

The differential ball screw shaft has the helical track of the grooves 51 within the shaft at end 48 at a different pitch than the pitch of the grooves 51 near end 52 of shaft 50 so that as the shaft rotates movement with respect to plate 54 and 56 will cause the plates to come together or go apart depending upon the direction of rotation of shaft 50. A multiplicity of ball bearings are retained and encapsulated within ball nuts 62. Each of the multiplicity of balls 63 are maintained within a continuous track 61 formed by the interior walls of the ball nut 62. The balls are in compressional contact with the walls of the continuous race or track 61, the compressional force being supplied by the series of parallel flexure assemblies 20 between faces 55 and 58 of plates 54 and 56. The differential ball screw 16 is operated at maximum design preloads which creates large ball and contact surface strains. The combined deflection of both ball 63 and contact surface 61 is many times ($100\times$ to $1000\times$) greater than the adjustment precision required (on the order of $1 \times 10^{-6}$ in.). Since this deflection is also many times larger than imperfections of machined surfaces of, for example, the surface of balls 63 and the surface of the continuous track 61, a significant improvement in precision is obtained. In addition, any errors introduced by ball or track surface anomolies will be averaged out between the multiplicity of balls 63.

Figure 3:
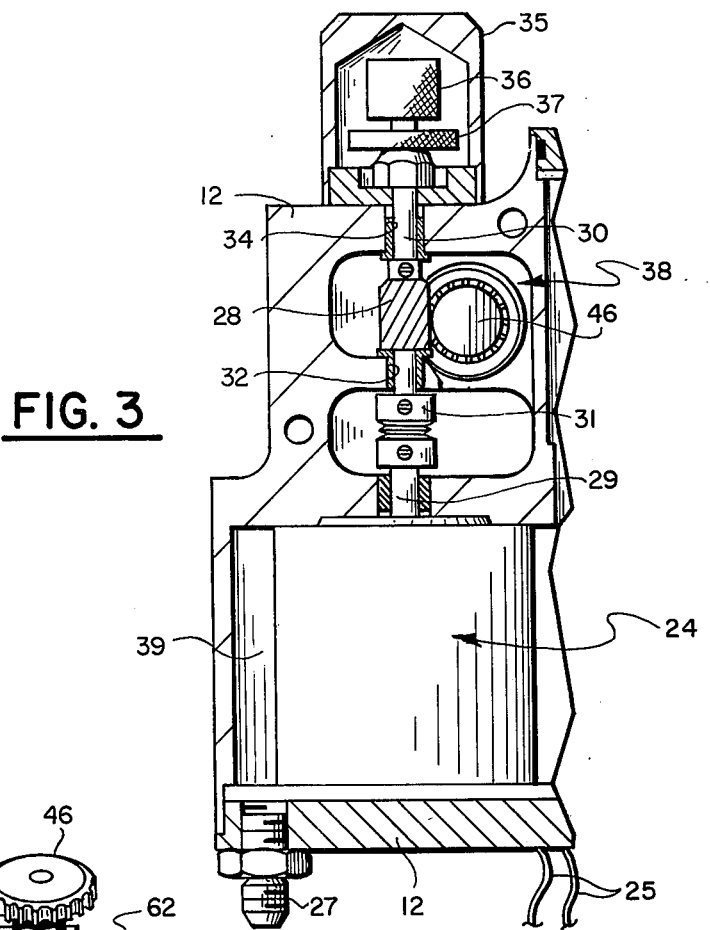
FIG. 3 is a partially cutaway cross-sectional view taken along lines 3—3 of FIG. 1.

FIG. 3 depicts the actuator drive assembly including the motor generally designated as 24. The motor 24, for example, is a stepping motor such as an "open loop" geared stepping motor with, for example, a high gear ratio coupled with the differential ball screw assembly 16a and 16b. This combination results in great precision with built-in holding or locking features. Actually, there are three methods of locking the mirror mount at a desired angle during operation. The stepping motors 24 with fields energized automatically lock the mirror in position after remote alignment. Although much smaller, an adequate holding torque is present in the quiescent motor due to inherent detect action in the permanent magnet poles (not shown). Third, a manual collet-type lock 37 is provided below knurled adjustment knob 36 on both actuator drive shafts generally designated as 50, thus providing a manual lock after the drive shafts are positioned. The motor speed of the stepping motors 24 is also variable to provide still another parameter for adjustment of the laser mirrors mounted to the mirror mount generally designated as 10.

A provision is made for purging the sealed motor cavities 39 surrounding the motor 24 with an inert conditioned gas such as nitrogen. The inert gas is introduced through conduit 27 into cavity 39 surrounding the motor 24. The purge minimizes thermal gradients in the mount base 12 which could adversely affect precision of the mirror mount 10.

Figure 4:
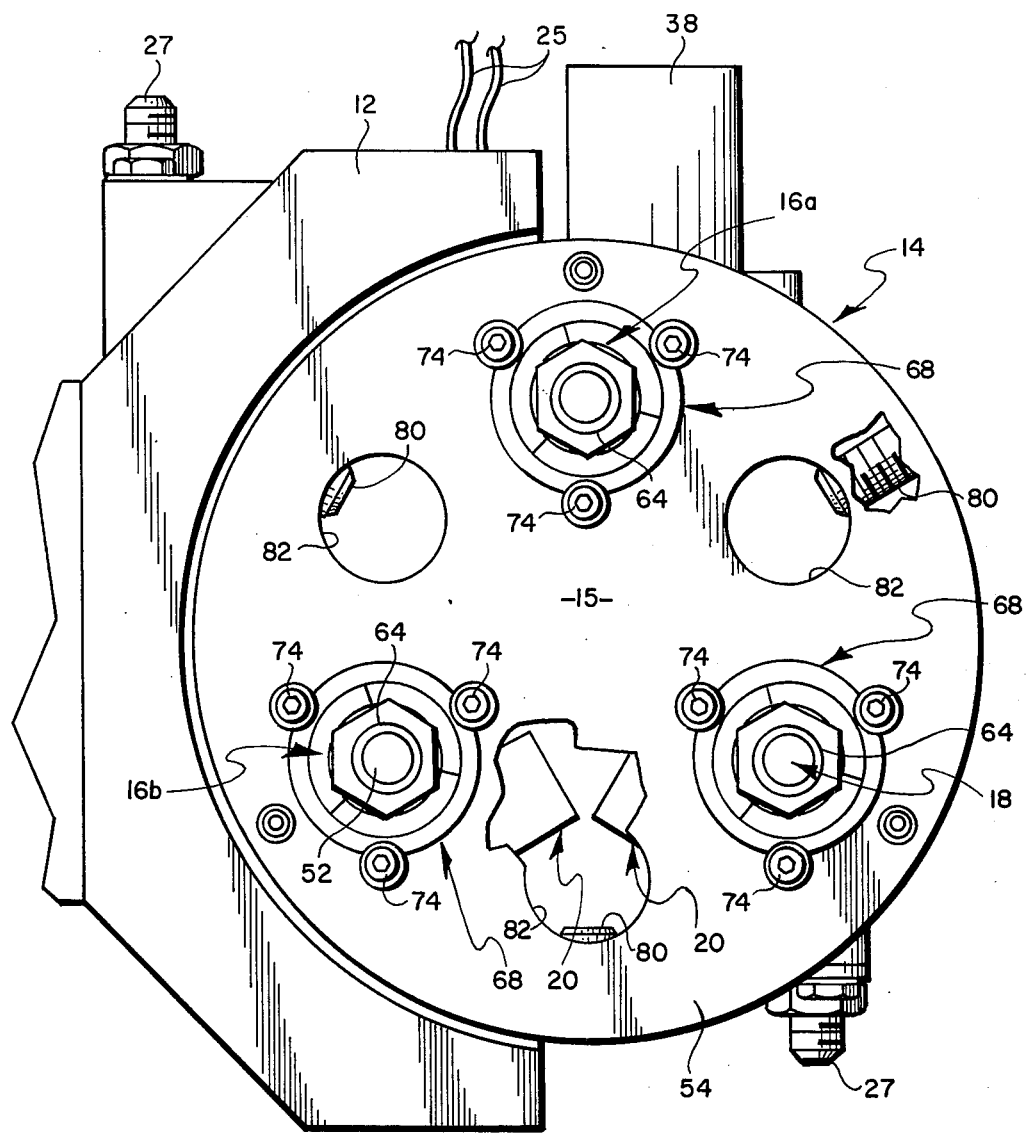
FIG. 4 is a view taken along lines 4—4 of FIG. 1 partially cut away.

Turning to FIG. 4, face 15 of movable backup plate 54 is illustrated with the mirror adapter plate removed for clarity. The mirror adapter plate 75 is mounted to movable plate 54 through, for example, three cylindrical pegs (not shown) which are inserted within recess 82 in movable plate 54. The pegs, after they are inserted within their respective recesses 82, are secured to movable plate 54 by tightening set screws 80 within the plate 54 against the pegs on the mirror. Differential ball screw actuators 16a and 16b are driven by a pair of stepping motors 24 as specifically described with respect to FIG. 3. Motors 24 are positioned within housing 12 on opposite sides, for example, the stepping motor driving actuator 16b is vertically positioned from the top left side of FIG. 4 while the stepping motor 24 for actuator 16a is positioned 180° from stepping motor 24 driving actuator 16b and is located in the lower right-hand side of the FIG. 4. The fixed actuator generally designated as 18 is positioned in the right-hand corner of a triangle formed by the fixed actuator 18 and the two ball screw actuators 16a and 16b.

Turning now to FIG. 5, the perspective view shows movable plate 54 removed from the backup plate assembly 14 to clearly show the relationship of the ball screw actuator 16a and 16b with respect to the fixed actuator generally designated as 18. This view additionally shows the arrangement of the pairs of flexure assemblies 20. Each of the three pairs of flexures generally designated as 20 are so arranged about 120° apart so that the long axis alignments of each of the pairs of flexures 20 are so configured to intersect the center of the circular fixed plate 56. This arrangement provides resistance to shear forces caused by the weight of the mirror mounted to movable plate 54 thus minimizing hysteresis effect. The respective joined "V" formed by legs 43 and 45 (FIG. 7) of each individual flexure 21 and 23 positioned on either side of the actuators 16a, 16b, and fixed actuator 18 being oriented 180° one from the other thus providing a substantially rigid shear resistance while maintaining flexibility for precise angular and translational positioning of the laser mirror mount device 10.

Figure 6:
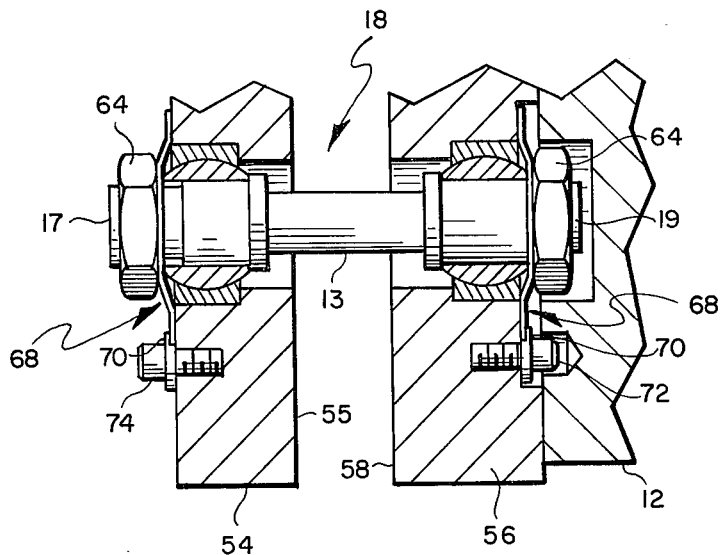
FIG. 6 is a cross-sectional view of the fixed actuator.

Turning to FIG. 6, the fixed actuator generally designated as 18 is illustrated between fixed plate 56 and the movable plate 54. The fixed actuator 18 is connected with plates 54 and 56 through a ball swivel assembly 60. The swivel joints 60 rotate within swivel cages 67 connected to plates 56 and 54. The ends 17 and 19 of shaft 13 are secured to plates 54 and 56 through nut 64 and lock washer 68. The peripheral edge 70 of washers 68 being secured to plates 54 and 56 by respective locking screws 74 and 72.

Figure 7:
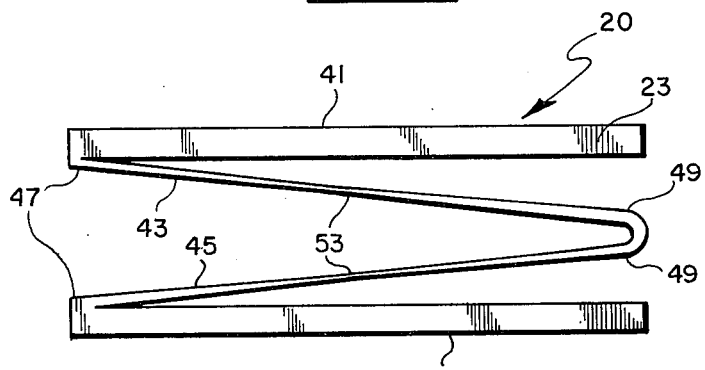
FIG. 7 is a side view of one of the "V" type flexures.

FIG. 7 is a side view of one of the flexures making up flexure assembly 20. A V-shaped flexure is metallurgically bonded to flexure plates 33 and 41 at ends 47 of legs 43 and 45. Each leg 43 and 45 is thicker at ends 47 and 49 than at the intermediate position 53 of each of the legs. The individual legs or "elastic beams" 43 and 45 of each flexure assembly 20 are tapered as heretofore described to approach a constant stress condition minimizing actuator preload variations over the adjustment range. This feature improves precision by maintaining the desired actuator bearing deflections within required parameters.

Figure 8:
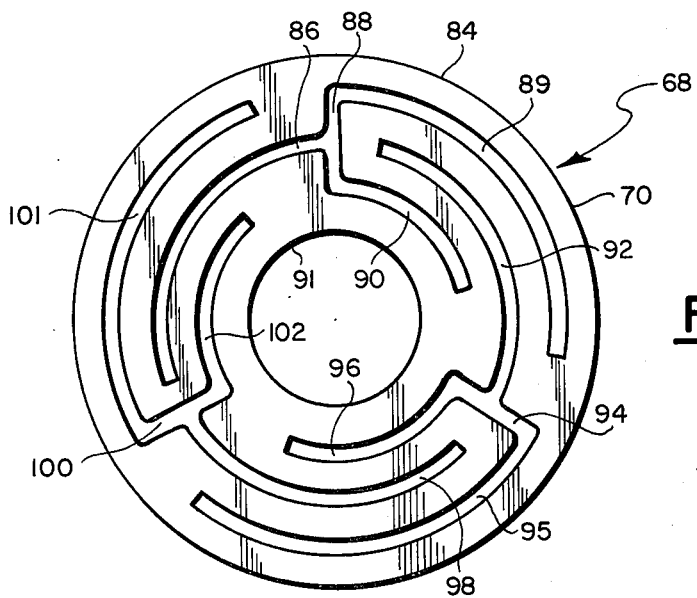
FIG. 8 is a plan view of the special lock washer utilized in the preferred embodiment of the present invention.

FIG. 8 illustrates the flexible washer generally designated as 68. The washer defines an outer peripheral edge 70 which is locked to the movable plate 54 and fixed plate 56 as heretofore described. An inner hole defined by the washer 91 defines an edge that is fixed to the ball screw actuator at shafts 50 and the fixed actuator shaft 13 through nuts 64. An arcuate slot 86 transitions into dividing slot which leads to a continuing arcuate slot 89 and slot 90. Slots 89 and 90 overlap another arcuate slot 92 that transitions through dividing slot 94 which divides into arcuate slots 95 and 96. Slots 95 and 96 overlap yet another arcuate slot 98 which transitions through dividing slot 100 into pairs of slots 101 and 102. Slots 101 and 102 overlap the initial arcuate 86. The unique washer configuration allows axial movement of the ball screw actuators 16a and 16b which allows the shaft to move eccentrically with respect to the hole through the movable plate 54 yet the ball nut 62 will not be allowed to rotate with respect to the movable plate 54. By locking the outer peripheral edge 70 of the washer 68 to the movable plate 54 and additionally locking the inner surface defined by the opening 91 to the shaft, the washer serves to prevent rotation of the shafts, yet allows flexibility in that the end of the shaft 50 may move through an eccentric arc with respect to the swivel joints 60 supporting the ends 52 of shaft 50.

It would be obvious, of course, to align components other than laser mirrors such as radar reflectors, transmitter-receivers and the like.

It would additionally be obvious to replace the fixed post actuator 18 with a third ball screw actuator so that the mirror may tip, tilt about two orthoganol axes as well as the ability to translate axially back and forth.

It will, of course, be realized that various modifications can be made in the design and operation of the present invention without departing from the spirit thereof. Thus, while the principle, preferred construction, and mode of operation of the invention have been explained in what is now considered to represent its best embodiment has been illustrated and described, it should be understood that within the scope of the attendant claims the invention may be practiced otherwise than as specifically illustrated and described.

I Claim:

1. In an apparatus to suspend and remotely position a device affixed to a backup plate and cantilevered from a fixed support by at least one V-shaped beam flexure suspension support, said device having at least one preloaded actuating means between said backup plate and said fixed support, the improvement which comprises:
    at least one preloaded differential ball-bearing screw actuating means affixed between said backup plate at a first end and said fixed support at a second end, said ball-bearing screw having a multiplicity of ball bearings encapsulated within an enclosed continuous helical race at both said first and second ends, said helical race at said first end having a different pitch angle than said helical race at said second end to provide differential movement between said first and second ends as said screw is rotated either clockwise or counter-clockwise, each of said multiplicity of ball bearings within said enclosed continuous race are in compressional contact with walls formed by said enclosed continuous race, the compressional force being supplied by said at least one V-shaped beam flexure between said backup plate and said fixed support, the combined deflection of both ball and contact surface of said walls averages out any error introduced into said apparatus between the multiplicity of balls which provides an adjustment precision of the backup plate with respect to said fixed support of about $0.5 \times 10^{-6}$ in.

2. The invention as set forth in claim 1 wherein there are two differential actuators in combination with a fixed post support having swivel joints at first and second ends, said swivel joints connect to said backup plate at said first end and to said fixed post support at said second end to position said device in tip and tilt.

3. The invention as set forth in claim 1 where there are three pairs of V-shaped flexure suspension supports so arranged to uniformly load said backup plate to reduce distortion.

4. The invention as set forth in claim 3 wherein each flexure in said pair of flexures is aligned in parallel with the V-portion of one of said flexures positioned opposite to the "V" of the other flexure, each pair of said flexures being positioned about 120° one pair of flexures from the other, the legs of said flexures being aligned to intersect the center of said backup plate, each flexure of said pair of flexures being positioned on opposite sides of said actuators and said fixed post to uniformly load said backup plate to reduce distortion.

5. The invention as set forth in claim 4 where the individual legs of each flexure are tapered in thickness from a thick base at one end to a thin intermediate section back to a thick base at the other end of said legs, said legs are tapered to provide a more constant stress condition to minimize said ball screw actuator preload variations over the adjustment range of said actuator.

6. The invention as set forth in claim 1 where said device to be positioned is a mirror affixed to said backup plate.

7. The invention as set forth in claim 1 wherein said preloaded differential ball-bearing screw has swivel joints at said first and second ends to accommodate for tip and tilt of said backup plate with respect to said fixed support.

8. The invention as set forth in claim 7 further comprising a locking ring adjacent each of said swivel joints to prevent said swivel joint from turning during ball screw activation, said locking ring having a center opening formed by said ring to accept the ends of said ball screw, said ring having a series of arcuate slots formed by said ring between said opening and an outer peripheral edge of said ring, said edge being fixed to said backup plate or support base, the inner portion being locked to said ends of said ball screw, the arcuate slots allow the ends of said ball screw to move axially inwardly and outwardly and through a displacement substantially transverse to the face of said locking rings while said rings simultaneously prevent rotation of said actuation ball screw.

* * * * *